United States Patent [19]
Ballestrazzi et al.

[11] Patent Number: 6,032,781
[45] Date of Patent: Mar. 7, 2000

[54] DEVIATOR DEVICE FOR TRANSPORTING PRODUCTS, IN PARTICULAR GRAPHIC OR EDITORIAL PRODUCTS

[75] Inventors: Aris Ballestrazzi; Lamberto Tassi, both of Savignano Sul Panaro, Italy

[73] Assignee: Sitma S.p.A., Modena, Italy

[21] Appl. No.: 08/715,497

[22] Filed: Sep. 18, 1996

[30] Foreign Application Priority Data

Oct. 3, 1995 [IT] Italy ................................. MI95A 2018

[51] Int. Cl.[7] .................................................. B65G 47/46
[52] U.S. Cl. ..................... 198/369.4; 198/861.2
[58] Field of Search ............................ 198/369.5, 861.2, 198/369.1, 369.4

[56] References Cited

U.S. PATENT DOCUMENTS 1,906,288  5/1933  Twomley .
5,224,584  7/1993  Best et al. .

FOREIGN PATENT DOCUMENTS

2167368 A  5/1986  United Kingdom .

*Primary Examiner*—Joseph E. Valenza
*Assistant Examiner*—Khoi H. Tran
*Attorney, Agent, or Firm*—Oblon, Spivak, McClelland, Maier & Neustadt, P.C.

[57] ABSTRACT

A deviator device for transporting products, in particular graphic or editorial products, which receives one or a stacked number of products and feeds them to a further station for a subsequent handling stage, The deviator device includes a transport table located on a support structure and provided with advancement elements for the products. More particularly the support structure is articulated so as to be able to be curved and swivelled by virtue of being formed from a plurality of support elements hinged one to another by pivots. Each support element carrying strip or slat elements on its upper surface, there being provided for the advancement elements drive apparatus able to achieve a speed differentiation between the two transverse sides of the advancement elements as the deviation position of the support structure varies. Also included is an actuator for causing one end of the support structure to move between positions aligned with transport units.

12 Claims, 7 Drawing Sheets

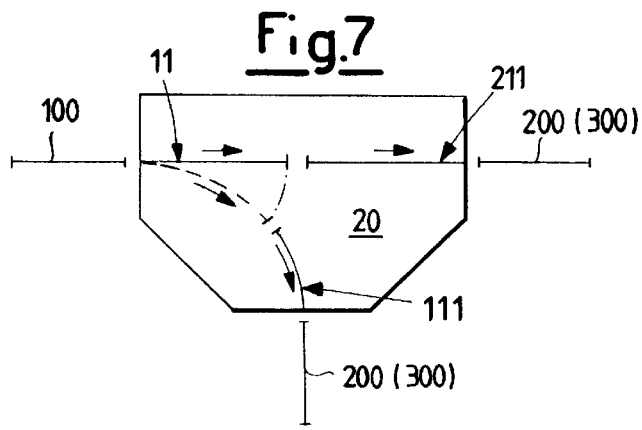
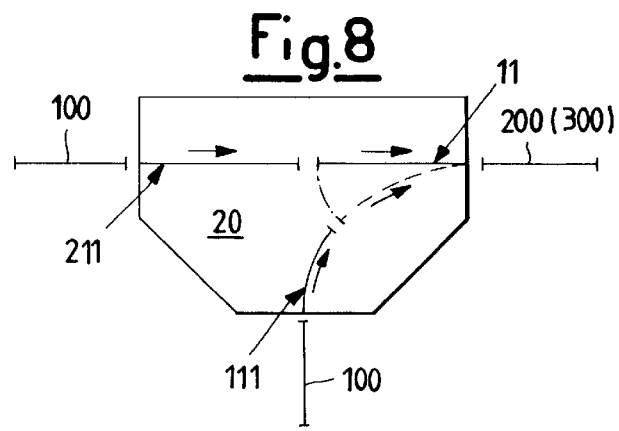
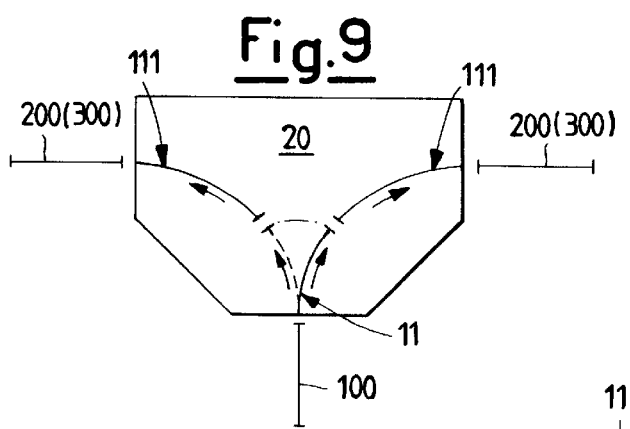
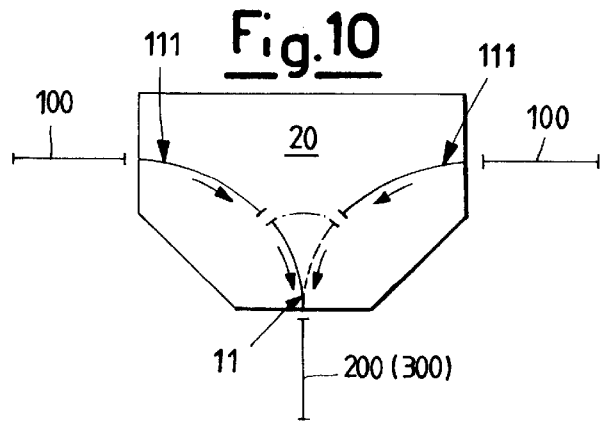

DEVIATOR DEVICE FOR TRANSPORTING PRODUCTS, IN PARTICULAR GRAPHIC OR EDITORIAL PRODUCTS

BACKGROUND OF THE INVENTION

1. Field of the Invention

This invention relates to a deviator device for transporting products, in particular graphic or editorial products.

2. Disclosure of the Invention

In the graphics or editorial industry the handling of products, such as single sheets, newspapers, magazines, books, brochures etc., is of primary importance. In this respect, their transport must take place at a considerable advancement rate within the very short times allowed to move them, and moreover the product dimensions must not be excessive, this often being the cause of instability and break-up of the handled product.

These products, for example originating from either a single or various production lines, must be fed to a subsequent handling or packaging stage. This feed can involve either single products or products stacked one on another. Such automatic handling may for example be necessary at the exit of a stacker feeding a packaging or binding machine without the products shifting from their feed direction or, if stacked, without them breaking up.

SUMMARY OF THE INVENTION

An object of the present invention is therefore to provide a device able to deviate the path of single or stacked products, in particular graphic or editorial products, along a preselected variable direction without the danger of any error and at high speed.

A further object is to provide a device which is extremely reliable and versatile and allows path variation according to requirements.

These objects are attained according to the present invention by a deviator device for transporting products, in particular graphic or editorial products, which receives one or a stacked number of said products and feeds them to a further station or resting surface for a subsequent handling or processing stage, comprising a transport table located on a support structure and provided with advancement elements for said products, characterised in that said support structure is articulated so as to be able to be curved and swivelled by virtue of being formed from a plurality of support elements hinged one to another by pivots, each support element carrying, on its upper surface, strip or slat elements arranged to define said transport table together with said advancement elements projecting from it, there being provided for said advancement elements drive means able to achieve a speed differentiation between the two transverse sides of said advancement elements as the deviated position of said support structure varies, and an actuator for causing one end of said support structure to move between at least two positions aligned with transport units.

BRIEF DESCRIPTION OF THE DRAWINGS

The characteristics and advantages of a deviator device for transporting products, in particular graphic or editorial products, according to the present invention will be more apparent from the description thereof given hereinafter by way of non-limiting example with reference to the accompanying drawings, in which:

FIGS. 7–10 show certain plan schemes from above of possible arrangements of the deviator device of the present invention. The figures show a deviator device for transporting products, in particular graphic or editorial products, constructed in accordance with the invention and positionable, for example, downstream of a stacker 100.

DESCRIPTION OF THE PREFERRED EMBODIMENTS

Figure 1:
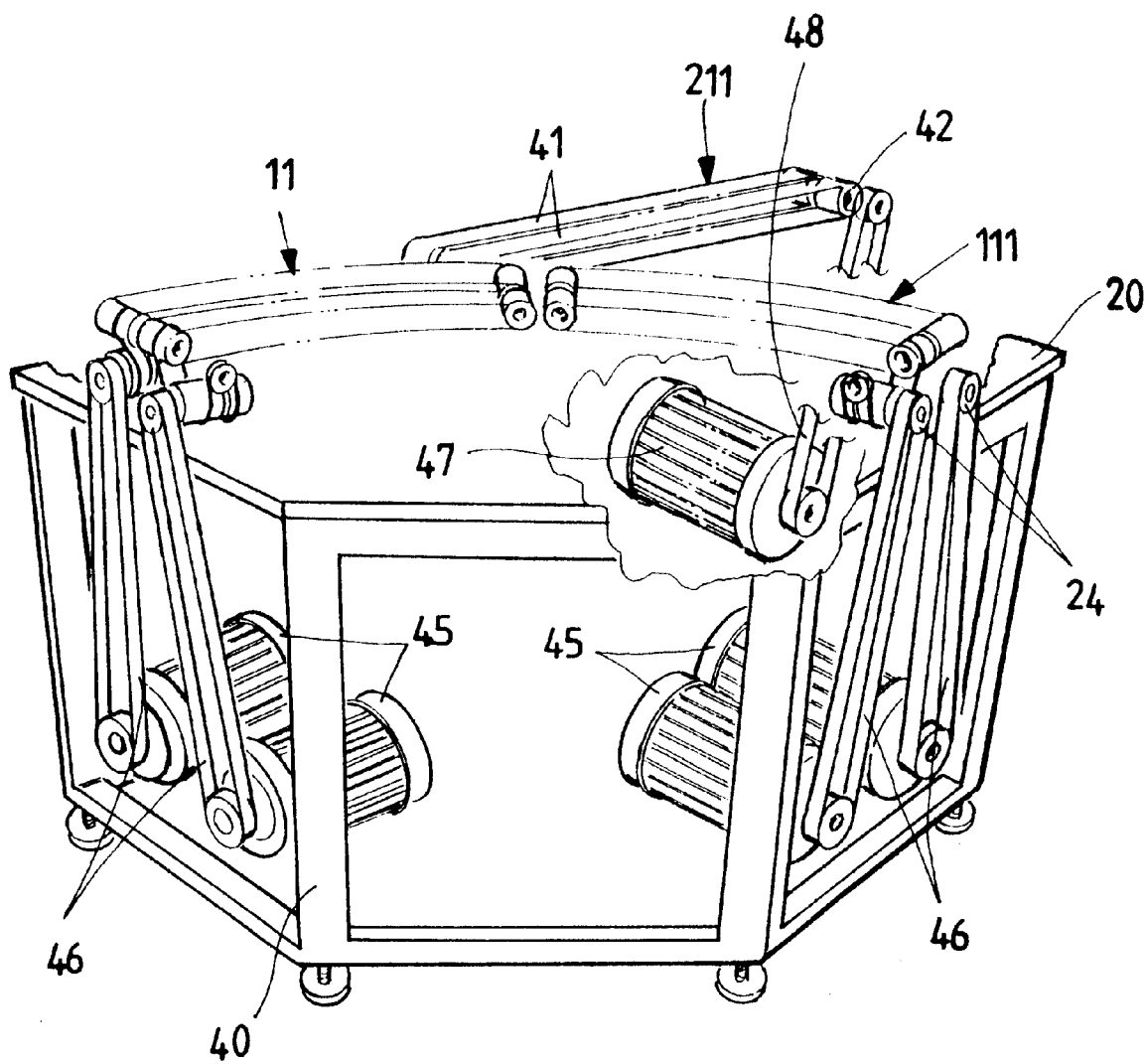
FIG. 1 is a partial perspective view showing only the drive of a deviator device according to the present invention, combined with other transport units to show one possible application, with various elements excluded.

The device of the invention hence receives the products, not shown but resting on it, having originated from the stacker 100, and feeds them to a further station or resting surface for the next handling or processing stage, such as by a packaging machine 200 or a binding machine 300, along at least two directions, or alternatively receives them from two directions and combines them along a single direction. The provision of a high-speed deviator according to the invention is necessary to enable a number of products arriving from different production lines to converge for feeding to a single packaging or binding line, so minimizing investment costs for such equipment. Alternatively, in the daily newspaper industry, in which the stacker production must not be halted if the downstream packaging or binding line stops or malfunctions, a deviator according to the invention can be provided to deviate the stacks onto an equivalent parallel line. In the illustrated embodiment, the deviator device of the present invention consists essentially of a motorized transport unit 11 which can be curved and swivelled on a table between two positions so as to be alignable with a fixed pair of further motorized transport units 111 and 211 in order to feed them in succession with graphic or editorial products.

The curvable and swivelling motorized deviator device is indicated overall by 11 and comprises an articulated structure consisting of a plurality of support elements 12 hinged together by pivots 13 located within bushes or bearings 10. On its upper surface, each support element 12 carries strip or slat elements 14 arranged to define the transport table for said products, not shown. The strip or slat elements 14 are of S cross-section so that successive elements become superposed and by mutual articulation maintain a sufficient transport table. More precisely, as shown in the figures, to each support element 12 there are connected two halves of each strip or slat element 14, each provided with an aperture 15. The aperture 15 allows the partial emergence of rollers 16 provided with recessed seats 16' and projectingly mounted on shafts 17 rigid transversely on opposite sides with each support element 12. The rollers 16 located in this manner form two rows of rollers positioned parallel to each other on opposite transverse sides of a central axis through the articulated structure, to define a longitudinal path for the products. Lowerly, some of said support elements 12 comprise, on transversely projecting arms 18, a number of wheels 19 to facilitate the movement of said articulated structure, comprising the support elements 12 with relative additional elements, on an underlying table 20 of the support frame between two positions. Abutment elements 21 acting as guides and limit stops, for example of step shape, are located on the table 20 to define and create the correct curved position of the entire motorized transport deviator device.

The transport deviator device also comprises a plurality of endless elastic belts 22, for example of round type, extending partly within recessed seats 16' about at least one of the rollers 16 of each of the two rows and partly about a relative underlying transmission, indicated overall by 23 and provided for each row. Further belts 22', similar to the preceding, are located between two successive rollers of each row to determine their correlated rotation.

The underlying pair of transmissions 23 rotates, via the belts 22, the rollers 16 provided on the transport table defined by the strip elements 14. Each transmission 23 comprises an end pulley 24 rigid with a first cardan shaft 25 which drives a second cardan shaft 26. On each of the two shafts 25 and 26 there are mounted a series of keyed pulleys 27 and a series of idle pulleys 28 positioned alternately in pairs. The belts 22 which rotate the rollers 16 pass about the paired pulleys 27 and 28, and about further idle deviation pulleys 29 projecting rigid with the support elements 12 in an intermediate position between the two preceding pulleys 27 and 28. As stated, the driven rollers 16 transmit rotation to the further rollers 16 via further round belts 22'.

It should be noted that the cardan shafts 25 and 26 are also telescopic in their portion 30 to allow correct transmission even when the structure of the entire motorized device is curved. The curving of said articulated support, ie its passage from one to the other position, is achieved by an actuator element 31 consisting of a mechanically operated cylinder, the rod 32 of which is rigid with a swingable cross-member 33.

The cross-member 33 is pivoted at one end, at 34, to the support frame of the device, whereas at its other end it is pivoted at 35 to the front part of the articulated support, ie to a first support element 12. This arrangement for swivelling the support is positioned below the table 20 of the support frame. The second pivot 35 can rock within an aperture provided in the table 20, there being also provided a wheel 37 rigid with the pivot 35 and rotatable thereon. The wheel 37, by engaging in a profiled recess 38 provided below the table 20 and rigid with it, acts as a guide for the movement of the device support structure and also as a cam element.

An elastic element 39 acts between the pivot 35 and the device support frame so as to urge the articulated structure comprising the support elements 12 into a state of continuous pretension, ensuring horizontal rigidity.

Figure 2:
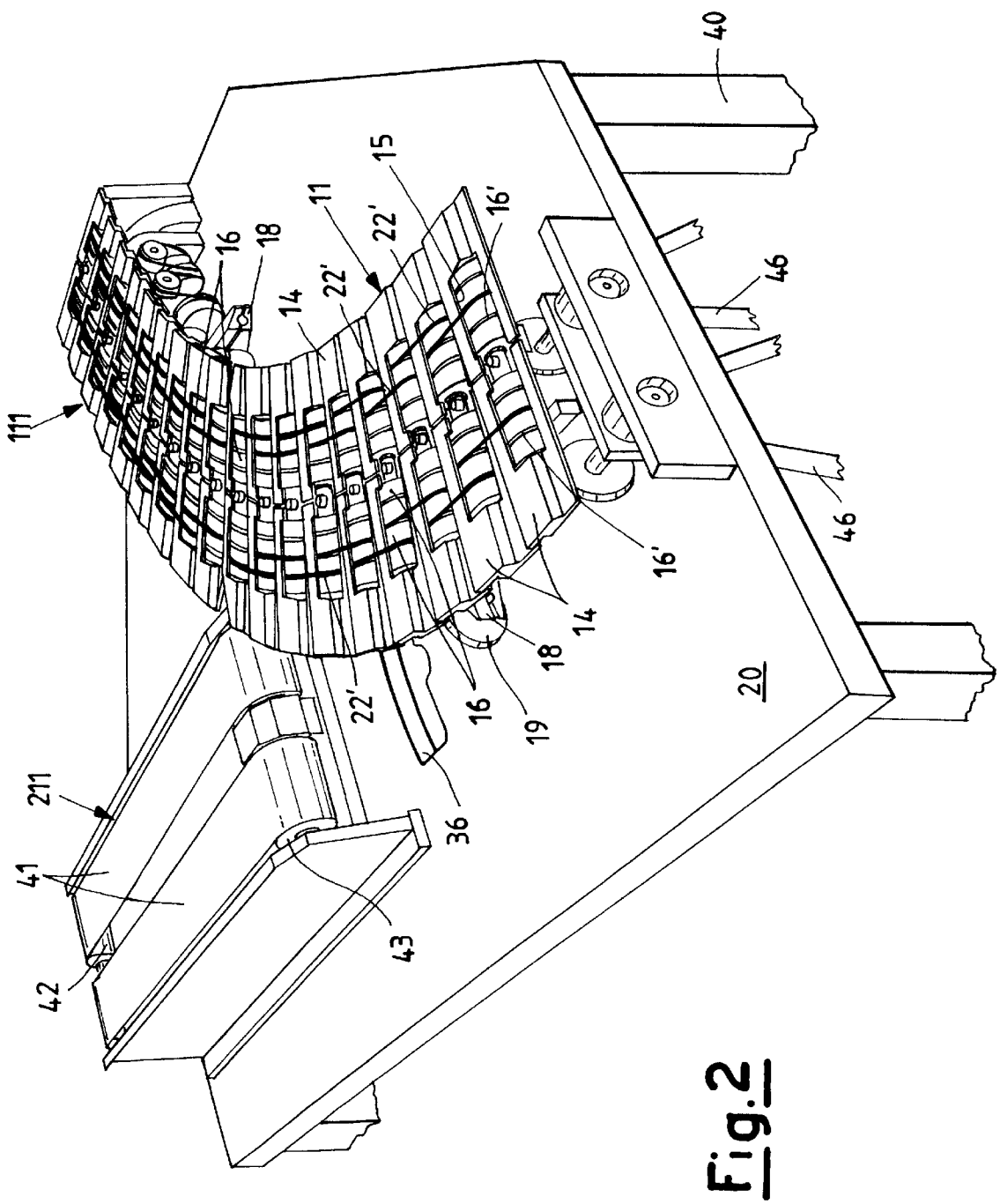
FIG. 2 is a perspective view similar to FIG. 1 but including the further elements of the invention.
Figure 3:
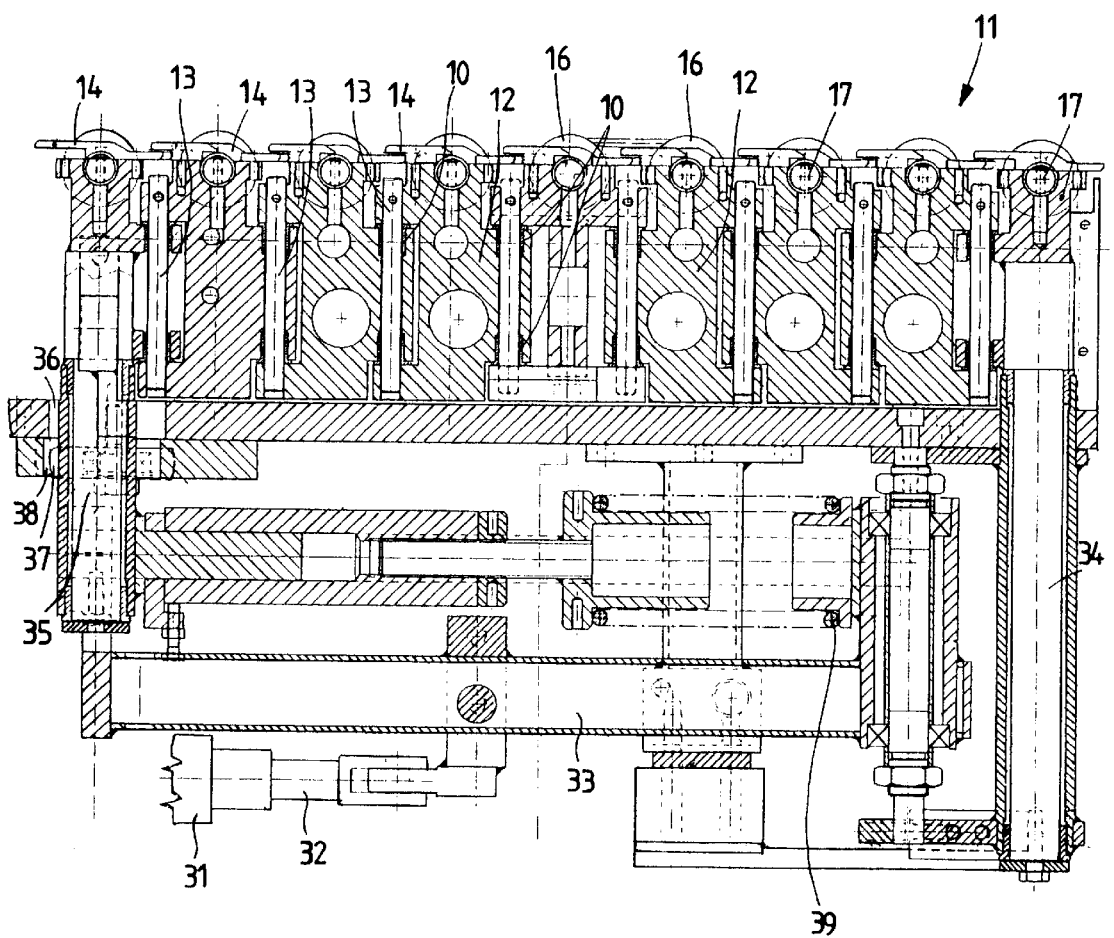
FIG. 3 is a longitudinal section showing only the articulated transport unit of the device of the present invention.
Figure 4:
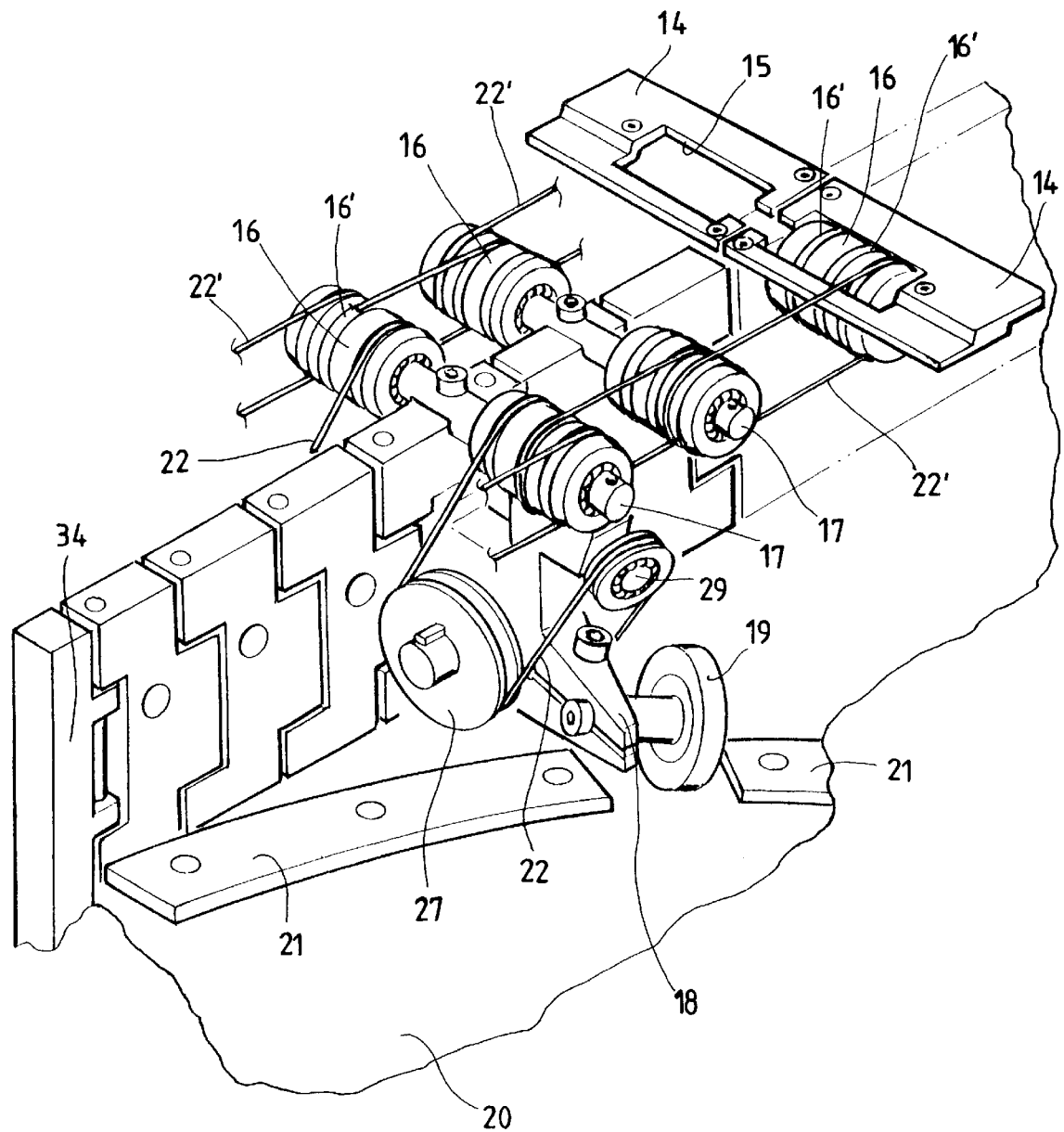
FIG. 4 is an enlarged partial perspective view of certain elements of that portion shown in FIG. 3, located on the swivel table.
Figure 5:
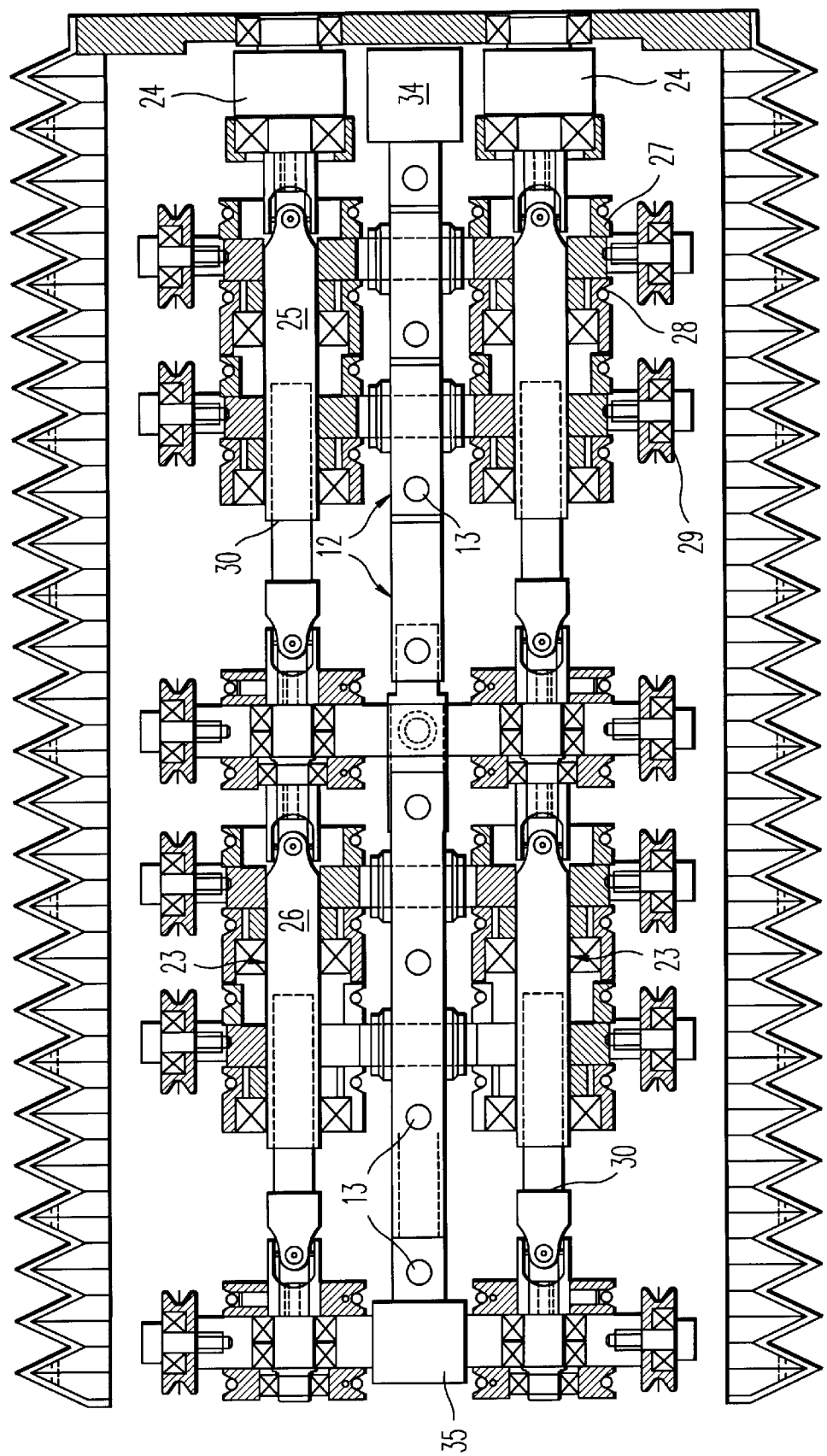
FIG. 5 is a plan section through the transmission driving the belts and transport rollers positioned above the deviator device of the invention.
Figure 6:
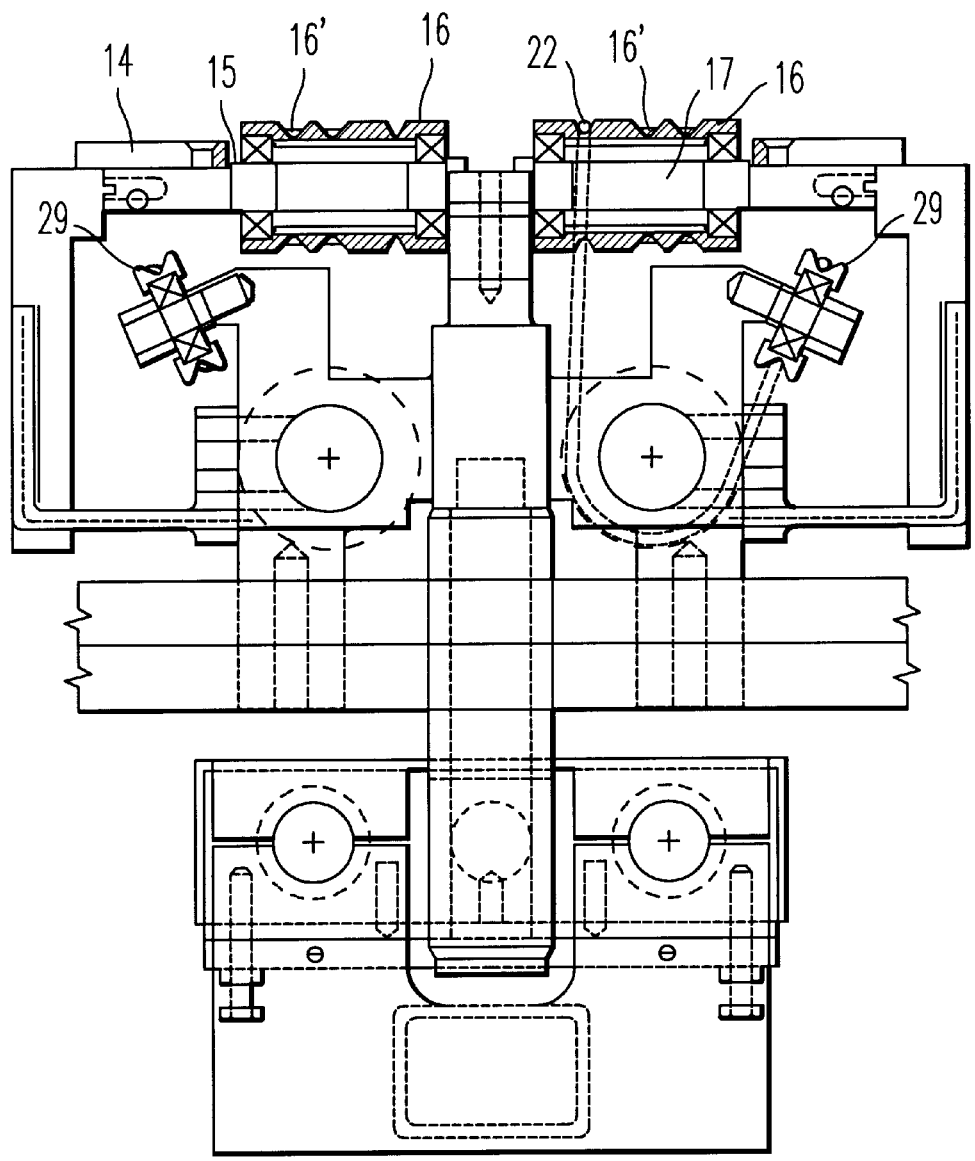
FIG. 6 is a cross-section through the transmission of FIG. 5.

FIG. 2 shows a possible embodiment in which, in addition to the aforedescribed curvable and swivelling motorized deviator device with its articulated structure 11, there are provided on a general support frame 40 for the device a second motorized transport unit 111, located in a fixed curved position, and a third motorized transport unit 211 located in a fixed straight position.

The second transport unit 111 is also curvable and has a structure entirely similar to that already described, except for the lack of the lower drive for moving the entire articulated structure. It can be noted that the facing ends of the articulated transport unit or device 11 and of the fixed unit or device 111 comprise strip or slat elements 14 which are laterally bevelled so as to improve the coupling between the two devices.

In contrast the third motorized transport unit 211 comprises a framework fixed to the table 20 and is provided with two side-by-side belts 41. The conveyor belts 41 extend endlessly about rollers 42 and 43 to form the transport surface for the graphic and/or editorial products.

The drive for these three units is positioned below their support table and comprises for each of the first two curvable units a pair of geared motors with inverters 45 for transmitting movement via relative belts 46 to the end pulleys 24 of the transmissions 23. A third motor with inverter 47 rotates via a belt 48 the roller 42 which entrains the side-by-side flat belts 41.

FIGS. 7–10 show some schemes, in plan view from above, of possible arrangements of the deviator device 11 of the present invention combined with the further transport units or devices 111 and 211 heretofore described.

It can be seen that FIG. 7 reproduces essentially the aforedescribed example in which the products arriving from a single feed are separated along two different directions by virtue of the deviator device of the invention plus two fixed transport units 111 and 211.

FIG. 8 shows a further example in which the products arriving from two fixed transport units 111 and 211 are combined along a single direction by virtue of the deviator device of the invention.

FIG. 9 shows an example in which the products arrive from a single feed articulated according to the invention and are separated along two different directions by virtue of two identical fixed curved transport units 111.

Finally, FIG. 10 shows a further example in which the products arriving from two fixed curved transport units 111 are combined along a single direction by virtue of the deviator device 11 of the invention.

Further equivalent technical arrangements can be defined using an articulated deviator device of the present invention.

The arrangement of a plurality of support elements 12 hinged to each other achieves excellent articulation while maintaining a certain rigidity deriving from the further arrangements provided by the invention.

It will be noted that the deviator system of the invention allows deviation with the product already positioned on it and advancing, in that the speeds of the two motors 46 can be varied by the inverter, their speed hence being variable at any moment. The actuator 31 is controlled in such a manner as to cause the movement synchronously with these variations. The two rows of rollers rotate at equal speeds when the structure is straight and at different speeds (the outer at the higher speed, the inner at the lower speed) when the structure is curved.

The lateral flexibility of the device derives from the pivoting between the support elements, their perfect arrangement in the various positions being ensured by their resting against the abutment elements 21 acting as guides and limit stops.

The product advancement system in the form of the two rows of rollers and belts operable at different peripheral speeds achieves adaptation to the curvature of the device, with correct product advancement, improved stability and lack of break-up if stacked. The particular S cross-sectional shape of the strip or slat elements results in proper maintaining of the transport table, the first of these in the swivelling end providing alignment with a further transport unit.

We claim:

1. A deviator device for transporting products, in particular graphic or editorial products, which receives one or a stacked number of said products and feeds them to a further station or resting surface for a subsequent handling or processing stage, comprising a transport table located on a support structure and provided with advancement elements for said products, wherein said support structure is articulated so as to be able to be curved and swivelled by virtue of being formed from a plurality of support elements hinged one to another by pivots, each support element carrying, on its upper surface, strip or slat elements arranged to define said transport table together with said advancement elements projecting from it, there being provided for said advancement elements drive means able to achieve a speed differentiation between two transverse sides of said advancement elements as a deviated position of said support structure varies, and an actuator for causing one end of said support structure to move between at least two positions aligned with transport units.

2. A device as claimed in claim 1, wherein said advancement elements consist of two rows of transversely adjacent rollers on said transport table, which are driven by respective transmissions each comprising an independent transmission operated by a variable speed motor.

3. A device as claimed in claim 2, wherein each of said transmissions comprises a first cardan shaft operating a second cardan shaft, each provided with a telescopic portion so as to allow correct transmission even when said support structure is curved, on each of said two shafts there being mounted a series of keyed pulleys and a series of idle pulleys positioned alternately in pairs, about which there passes a belt which also passes about each of said rollers.

4. A device as claimed in claim 3, further comprising in addition to said pulleys there are provided further idle deviation pulleys projecting rigid with said support elements in an intermediate position between said two pulleys.

5. A device as claimed in claim 3 or 4, further comprising on said rollers round belts which transmit rotation between successive pulleys.

6. A device as claimed in claim 1, wherein said support structure can articulate on a support table of a frame between said at least two positions defined by abutment elements for guiding and limit stop purposes rigid with said support table.

7. A device as claimed in claim 1, wherein each strip element of said transport table is formed as two side-by-side halves connected to said support element, which in its turn carries on a projecting shaft said rollers projecting transversely on opposite sides of each support element from apertures provided in said strip elements.

8. A device as claimed in claim 1, wherein said actuator consists of a cylinder acting between a support frame for said device and a pivot connected to the front part of said articulated structure to define an arrangement for controlling the swivelling of said support structure disposed below a swivel table for the device.

9. A device as claimed in claim 8, further comprising an elastic element positioned to act between said pivot and said device support frame so as to urge said articulated structure consisting of said support elements into a state of continuous pretension, ensuring horizontal rigidity.

10. A device as claimed in claim 1, wherein said device is associable upstream and/or downstream with a second motorized transport unit or device, located in a fixed curved position.

11. A device as claimed in claim 10, wherein said second motorized transport device located in a fixed curved position has a structure totally similar to that of said first device, except that said actuator for moving the entire articulated structure is lacking.

12. A device as claimed in claim 10, wherein said device is associable upstream and/or downstream with a third motorized transport unit or device on a framework provided with two side-by-side belts extending endlessly about rollers, and a variable-speed motor means.

* * * * *